(12) United States Patent
Ellis et al.

(10) Patent No.: US 12,405,437 B2
(45) Date of Patent: Sep. 2, 2025

(54) FIBER CARRYING STRUCTURE WITH RIP CORD AND RELATED METHOD

(71) Applicant: CORNING RESEARCH & DEVELOPMENT CORPORATION, Corning, NY (US)

(72) Inventors: Terry Lee Ellis, Hickory, NC (US); Martin Cervantes Martinez, Maiden, NC (US); Ellen Anderson Stupka, Statesville, NC (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 0 days.

(21) Appl. No.: 18/368,792

(22) Filed: Sep. 15, 2023

(65) Prior Publication Data
US 2024/0004154 A1 Jan. 4, 2024

Related U.S. Application Data

(63) Continuation of application No. 17/007,077, filed on Aug. 31, 2020, now Pat. No. 11,774,694.

(60) Provisional application No. 62/895,280, filed on Sep. 3, 2019.

(51) Int. Cl.
*G02B 6/44* (2006.01)
*G02B 6/46* (2006.01)

(52) U.S. Cl.
CPC ....... *G02B 6/4431* (2023.05); *G02B 6/44384* (2023.05); *G02B 6/566* (2023.05)

(58) Field of Classification Search
CPC .............................. G02B 6/4431; G02B 6/566
See application file for complete search history.

(56) References Cited

U.S. PATENT DOCUMENTS

| | | | |
|---|---|---|---|
| 687,678 A | 11/1901 | Durman | |
| 6,041,153 A | 3/2000 | Yang | |
| 6,101,305 A | 8/2000 | Wagman et al. | |
| 6,256,439 B1 * | 7/2001 | Brown | G02B 6/448 385/110 |
| 6,317,542 B1 | 11/2001 | Hardwick et al. | |
| 6,500,541 B1 | 12/2002 | Schoeck et al. | |
| 10,025,053 B2 | 7/2018 | Hudson et al. | |
| 2002/0122640 A1 | 9/2002 | Strong et al. | |

(Continued)

FOREIGN PATENT DOCUMENTS

| | | | |
|---|---|---|---|
| KR | 100708954 B1 * | 4/2007 | ........... G02B 6/4429 |
| KR | 10-0847018 B1 | 7/2008 | |

(Continued)

OTHER PUBLICATIONS

KR-100708954-B1 English translation (Year: 2007).*

(Continued)

Primary Examiner — Charlie Y Peng
(74) Attorney, Agent, or Firm — William D. Doyle

(57) ABSTRACT

An optical fiber carrying structure that includes a jacket and a rip cord is provided. Optical fiber cables are used to transmit data over distance. Generally, large distribution cables that carry a multitude of optical fibers from a hub are sub-divided at network nodes into subunits. To remove a jacket of a subunit, the subunit may be provided with an access feature such as a rip cord. Described herein is a rip cord for use with optical fiber carrying structures.

20 Claims, 6 Drawing Sheets

(56) References Cited

U.S. PATENT DOCUMENTS

| | | |
|---|---|---|
| 2003/0095763 A1 | 5/2003 | Dallas et al. |
| 2003/0118295 A1 | 6/2003 | Lail et al. |
| 2003/0118296 A1 | 6/2003 | Smith |
| 2005/0036750 A1* | 2/2005 | Triplett ............... G02B 6/4431 385/100 |
| 2006/0127014 A1* | 6/2006 | Ledbetter ............ G02B 6/4494 385/100 |
| 2010/0067855 A1* | 3/2010 | Barker ................ G02B 6/4429 385/109 |
| 2010/0189396 A1* | 7/2010 | Hashimoto .......... G02B 6/4413 385/112 |
| 2011/0081122 A1 | 4/2011 | Kim et al. |
| 2013/0040053 A1 | 2/2013 | Lee et al. |
| 2015/0086168 A1 | 3/2015 | Blazer et al. |
| 2017/0146760 A1 | 5/2017 | Kaji et al. |
| 2018/0203198 A1 | 7/2018 | McAlpine et al. |
| 2020/0142144 A1 | 5/2020 | Blazer et al. |

FOREIGN PATENT DOCUMENTS

| | | |
|---|---|---|
| WO | 02/22929 A1 | 3/2002 |
| WO | 2019/010291 A1 | 1/2019 |
| WO | 2020/117547 A1 | 6/2020 |

OTHER PUBLICATIONS

European Patent Application No. 20194108.5 Extended European Search Report dated Feb. 4, 2021; 14 pages; European Patent Office.
Roblon, "Roblon Polyester Ripcord", XP055768093, Available Online at <https://www.roblon.com/Admin/Public/DWSDownload.aspx?File=/Files/Files/Datablade/Fiber/Roblon_Polyester_Ripcord.pdf>, Feb. 15, 2020, 2 pages.
Starr Materials, "Ripcord", Available Online at <https://web.archive.org/web/20190412165642/http://www.star-materials.com/yarns/ripcord>, retrieved on Apr. 12, 2019, 3 pages.

* cited by examiner

FIBER CARRYING STRUCTURE WITH RIP CORD AND RELATED METHOD

CROSS-REFERENCED TO RELATED APPLICATIONS

This application is a continuation of U.S. patent application Ser. No. 17/007,077 filed Aug. 31, 2020, which claims the benefit of priority under 35 U.S.C. § 119 of U.S. Provisional Application No. 62/895,280 filed on Sep. 3, 2019, the content of which is relied upon and incorporated herein by reference in its entirety.

BACKGROUND

The present invention is related to optical fiber carrying structures and more particularly to optical fiber carrying structures that have a rip cord. Optical fiber cables are used to transmit data over distance. Generally, large distribution cables that carry a multitude of optical fibers from a hub are sub-divided at network nodes into subunits. To splice a subunit within a jacket, the jacket is generally first removed. Methods and assemblies for efficiently accessing the core inside a subunit are needed.

SUMMARY

In one aspect, embodiments of the disclosure relate to an optical fiber cable including an outer jacket, an inner jacket, a rip cord and an optical communication element. The outer jacket has an outer surface that is an outermost surface of the optical fiber cable. The inner jacket is located within the outer jacket. The inner jacket includes a first inner surface and an outer surface. A central bore extends within the inner jacket longitudinally between first and second ends of the jacket. The rip cord is located within the central bore and extends longitudinally between the first and second ends of the jacket. In one or more embodiments the rip cord has a break strength less than 75 N. The optical communication element is located within the central bore and extends longitudinally between the first and second ends of the jacket.

In another aspect, embodiments of the disclosure relate to an optical fiber carrying structure including an outer jacket, an inner jacket, a rip cord and an optical communication element. The outer jacket has an outer surface that is an outermost surface of the optical fiber carrying structure. The inner jacket is located within the outer jacket. The inner jacket has a first inner surface and an outer surface. A central bore extends longitudinally within the inner jacket between first and second ends of the jacket. The rip cord is located within the central bore and extends longitudinally between the first and second ends of the jacket. The rip cord is formed from a material that has a water absorption capacity of at least 10 grams of water per gram of the material. The optical communication element is located within the central bore and extends longitudinally between the first and second ends of the jacket.

In yet another aspect, embodiments of the disclosure relate to an optical fiber cable that includes an outer jacket, an inner jacket, a rip cord and an optical communication element. The outer jacket has an outer surface that is an outermost surface of the optical fiber cable. The inner jacket is located within the outer jacket. The inner jacket has a first inner surface and an outer surface. A central bore extends longitudinally within the inner jacket between first and second ends of the jacket. The rip cord is located within the central bore and extends longitudinally between the first and second ends of the jacket. The rip cord has a denier of less than 1000. The optical communication element is located within the central bore and extends longitudinally between the first and second ends of the jacket.

Additional features and advantages will be set forth in the detailed description that follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and the operation of the various embodiments.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION

Referring generally to the figures, various embodiments of an optical fiber carrying structure including a low strength and/or water-blocking rip cord are disclosed. An optical fiber carrying structure includes one or more subunits, each subunit including an optical fiber and a rip cord surrounded by a subunit jacket. The rip cord facilitates opening the subunit jacket to provide access to the underlying optical fiber, e.g., for routing from the cable, splicing, etc. In specific embodiments, the rip cord also provides water absorbing properties to help protect the underlying optical fiber from water that may penetrate the jacket of the subunit.

Various designs discussed herein improve optical signal attenuation performance of optical fiber cables. For example, optical fiber ribbon subunits, such as those containing 200 micron diameter optical fibers, demonstrate high signal attenuation at low temperatures when superabsorbent water blocking powder (SAP) is used as the water blocking component within the subunit jacket. In particular, subunits that include various SAP materials incur progressively increased optical signal attenuation when the subunit is cycled through progressively lower temperatures. Thus, embodiments of the subunit described herein improve the water blocking features of the subunit and reduce the signal attenuation of the optical fiber subunits compared to subunits that utilize superabsorbent water blocking powder (SAP). Various embodiments of optical fiber carrying structures are optical fiber cables that include multiple subunits, with each subunit including a jacket that surrounds an optical fiber ribbon and a rip cord.

In addition to providing water-blocking functionality, the rip cord also provides jacket opening functionality, in accordance with aspects of this disclosure. Specifically, some subunit designs with hand-peelable jackets can be difficult to open by hand, particularly if lengthy distances of the subunit jacket are being peeled. In such embodiments, the rip cord is strong enough to facilitate tearing of the subunit jacket to access the optical fiber ribbon within the subunit jacket. Accordingly, the rip cord provides both water blocking and rip-cord functionality and strikes an innovative balance between having sufficient strength to act as a rip cord while also performing the water-blocking functionality.

Figure 1:
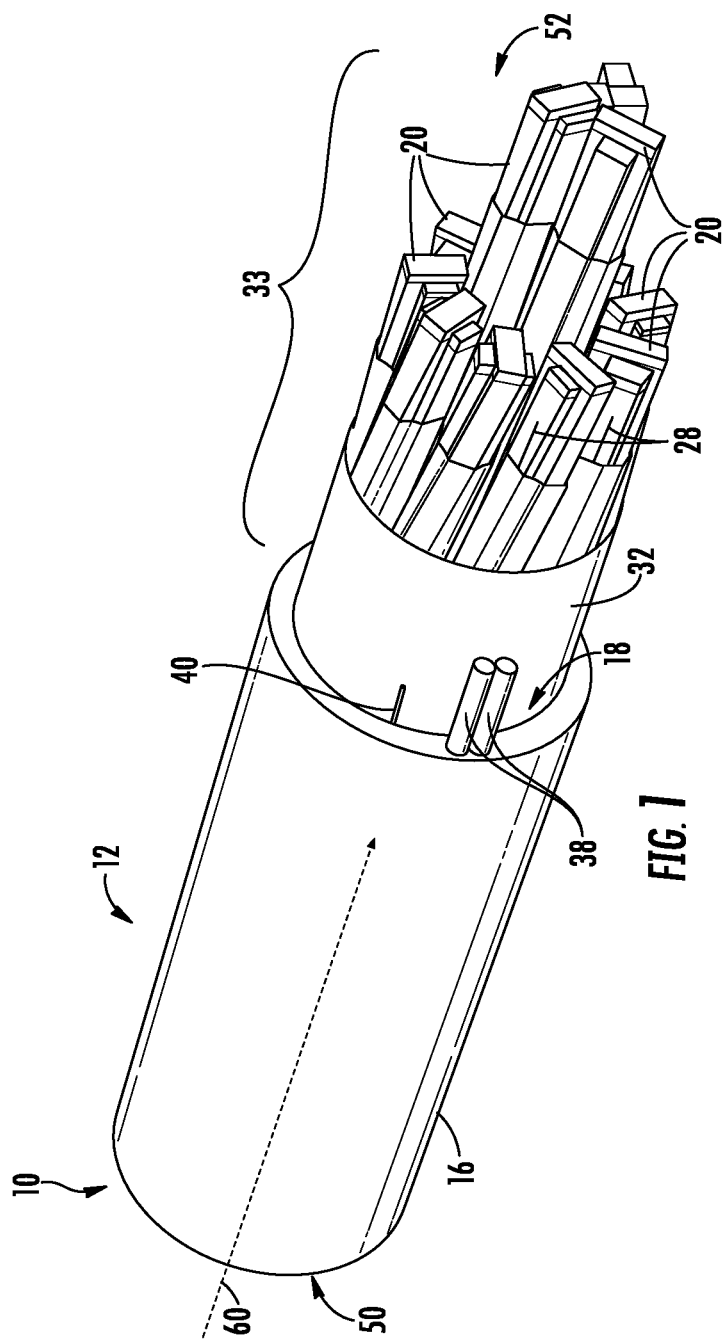
FIG. 1 depicts a perspective view of an optical fiber cable, according to aspects of the present disclosure.
Figure 2:
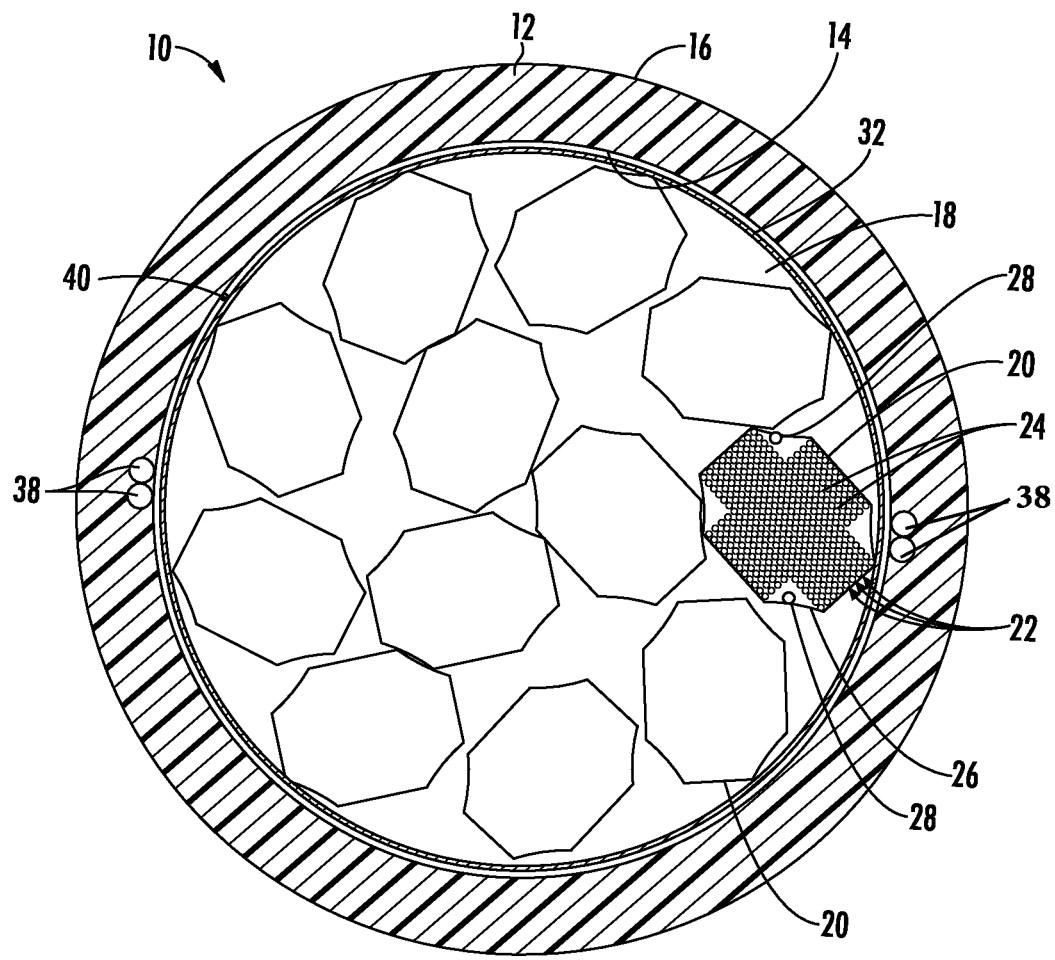
FIG. 2 depicts a cross-sectional of the optical fiber cable of FIG. 1, according to aspects of the present disclosure.

FIG. 1 and FIG. 2 depict an embodiment of an optical fiber carrying structure, shown as ribbon cable 10. The ribbon cable 10 includes a cable jacket 12 having an inner surface 14 and an outer surface 16. The inner surface 14 defines a central bore 18, and the outer surface 16 defines an outermost extent of the ribbon cable 10. In embodiments, the outer surface 16 defines an outer diameter of the ribbon cable 10 from 20 millimeters (mm) to 40 mm. While the term "diameter" is used, the outer surface 16 may not define a circle, and in such instances, "diameter" refers to the largest cross-sectional dimension of the ribbon cable 10. Further, in embodiments, the inner surface 14 and the outer surface 16 define a thickness of the cable jacket 12 from 1 mm to 10 mm, more particularly from 2 mm to 5 mm.

Disposed within the central bore 18 are a plurality of subunits 20. In embodiments, the subunits 20 are helically wound, which facilitates bending and coiling of the ribbon cable 10, e.g., enhancing the routability of the ribbon cable 10. In FIG. 2, one subunit 20 is shown in detail, while the remaining subunits 20 are shown schematically. As can be seen, the subunit 20 includes a plurality of ribbons 22. Each ribbon 22 includes a plurality of optical fibers 24 in a planar configuration. In one embodiment, the optical fibers 24 may be held in the planar configuration using a ribbon matrix material. In accordance with other aspects of the present disclosure, disposed within central bore 18 may be one or more subunits 20.

The cable jacket 12 includes a plurality of strengthening members, shown as strengthening yarns 38, contained within the material of the cable jacket 12 between the inner surface 14 and the outer surface 16. In an embodiment, the ribbon cable 10 includes four strengthening yarns 38 disposed within the cable jacket 12 in two pairs that are equidistantly spaced around the cable jacket 12. In accordance with, the strengthening yarns 38 are textile yarns. In accordance with aspects of the present disclosure, the textile yarns may have a density of 1 g/cm$^3$ to 5 g/cm$^3$, an elongation at break of 1% to 5%, a tensile strength of 500 MPa to 5 GPa, and/or a linear density of 1000 dtex to 5000 dtex. Exemplary textile yarns suitable for use as the strengthening yarns include at least one of glass fibers, aramid fibers, cotton fibers, or carbon fibers, among others.

In various embodiments, jacket 12 is formed from a polymer material and in specific embodiments is formed from a polyolefin material. Exemplary polyolefins suitable for use in the jacket 12 include one or more of medium-density polyethylene (MDPE), high-density polyethylene (HDPE), low-density polyethylene (LDPE), linear low-density polyethylene (LLDPE), and/or polypropylene (PP), among others. Exemplary thermoplastic elastomers suitable for use in the jacket 12 include one or more of ethylene-propylene rubber (EPR), ethylene-propylene-diene rubber (EPDM), ethylene-octene (EO), ethylene-hexene (EH), ethylene-butene (EB), ethylene-vinyl acetate (EVA), and/or styrene-ethylene-butadiene-styrene (SEBS), among others. In one or more embodiments the cable jacket 12 material has a low modulus (e.g., <100 MPa) at room temperature. In a specific embodiment, cable jacket 12 is formed from a material described in HI17-0080, TA 60007.

In various embodiments the cable jacket 12 includes an access feature 40, such as a rip cord or strip of polymer material that is dissimilar from the material of the cable jacket 12 (e.g., polypropylene strip in a predominantly polyethylene jacket). In embodiments, the rip cord is a yarn that includes at least one of a textile fiber (such as those listed above), liquid crystal polymer fibers, or PET polyester fibers, among others. In one embodiment, the ribbon cable 10 includes two access features 40 that are arranged diametrically within the cable jacket 12. In other embodiments, the ribbon cable 10 may include a single access feature 40 or more than two access features 40, such as up to four access features 40. In accordance with aspects of the present disclosure, the access features 40 may be positioned such that strengthening yarns 38 are evenly spaced around the access feature 40.

In the embodiment depicted in FIG. 1, the subunits 20 are contained in a water barrier layer 32 that prevents or limits water from contacting the subunits 20. In embodiments, the water barrier layer 32 is a water-blocking tape that absorbs water and/or swells when contacted with water. In other embodiments, the water barrier layer 32 is an SAP powder applied to the exterior of the subunits 20 and/or the inner surface 14 of the cable jacket 12. As used herein, all of the components from the water barrier layer 32 inward are referred to as the "cable core" 33.

Figure 3:
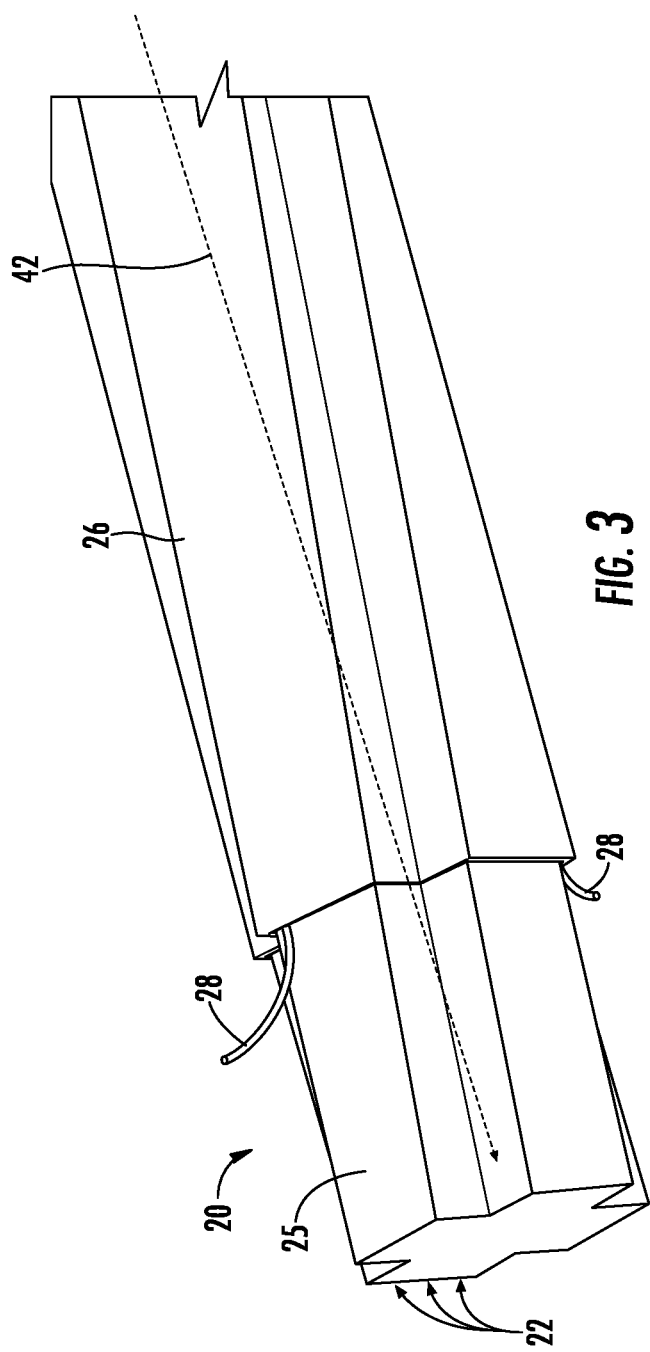
FIG. 3 depicts a perspective view an optical fiber carrying subunit of FIG. 1, according to aspects of the present disclosure.

FIG. 3 depicts an optical fiber carrying structure in accordance with aspects of the present disclosure, shown as a subunit 20. Subunit 20 includes jacket 26 surrounding an optical signal carrying medium, shown as optical fibers 24 (FIG. 2), and two access features, shown as rip cords 28. Rip cords 28 are arranged at different locations within jacket 26, such as being diametrically opposed to each other. Rip cords 28 extend substantially unwrapped and straight longitudinally along an outer surface 25 of the optical fibers 24 (FIG. 2) while optical fibers 24 (FIG. 2) twists around a longitudinal axis 42 of the jacket along the length of the jacket 26. As a result, from the perspective of optical fibers 24 (FIG. 2), rip cords 28 helically wind around optical fibers 24 (FIG. 2) along jacket 26. One advantage of this configuration is that a liquid transiting within jacket 26 longitudinally along optical fibers 24 (FIG. 2) will contact rip cord 28 and as a result the liquid will be at least partially absorbed by rip cord 28. In another embodiment, two or more rip cords 28 are located at the same and/or nearly the same location (e.g., such that the two or more rip cords 28 at the same location interface against each other along the length of jacket 26).

In accordance with aspects of the present disclosure, jacket 26 includes a thin sheath that is easily tearable. For example, a tube formed from a highly filled material renders it easily tearable by a craftsman merely using his/her fingers to tear the same. By way of example, tubes that are easily tearable may include filled materials such as polybutylene terephthalate (PBT), a polycarbonate and/or a polyethylene (PE) material and/or an ethylene vinyl acrylate (EVA) or other blends thereof having fillers like a chalk, talc, or the like; however, other suitable materials are possible such as a UV-curable acrylates.

According to one or more embodiments of rip cord 28, rip cord 28 has a break strength of less than 75 N as measured in accordance with ASTM D2256, Standard Test Method for Tensile Properties of Yarns by the Single-Strand Method. In other embodiments, rip cord 28 has a break strength of less than 30 N, or more particularly a break strength of less than 20 N, or more particularly a break strength of less than or equal to 11 N. According to one or more embodiments of rip cord 28, rip cord 28 has a break strength greater than 4 N, or more particularly greater than 4 N and less than 20 N, or more particularly at least 5 N and no more than 11 N. In various embodiments, a force to tear jacket 26 longitudinally corresponds to the break strength of rip cord 28 (i.e., the force to tear jacket 26 longitudinally is less than the break strength of rip cord 28).

According to one or more embodiments of rip cord 28, rip cord 28 has a denier of less than 1000, and more particularly having a denier of less than 750, and more particularly having a denier of less than or equal to 500. As used herein, the denier of a given elongated structure, such as rip cord 28, as measured in accordance with ASTM D 1577, Linear Density of Textile Fibers. According to one or more embodiments of rip cord 28, rip cord 28 has a denier of at least 150 and less than 1,000, or more particularly of at least 150 and less than 750, or more particularly of at least 150 and no more than 500.

According to one or more embodiments of rip cord 28, rip cord 28 has SAP distributed throughout rip cord 28, and rip cord 28 has a water absorption capacity of greater than 10 grams of water absorbed per gram of rip cord 28, or more particularly, of at least 20 grams of water absorbed per gram of rip cord 28. According to one or more embodiments, rip cord 28 has a water absorption capacity of at least 20 grams of water absorbed per gram of rip cord 28 and no more than 60 grams of water absorbed per gram of rip cord 28, and more particularly, of at least 40 grams of water absorbed per gram of rip cord 28 and no more than 50 grams of water absorbed per gram of rip cord 28, and more particularly, of 45 grams of water absorbed per gram of rip cord 28.

In a specific embodiment, rip cord 28 is made of a material having a final denier of 275, a break strength of 11 N, and an absorption capacity of 45 grams of water absorbed per gram of rip cord 28. As an example of this embodiment, rip cord 28 is made of a material identified as P150LS—Low Shrink PET Polyester.

In a specific embodiment, rip cord 28 is made of a material having a base denier of 150, a break strength of 5 N, and an absorption capacity of 45 grams of water absorbed per gram of rip cord 28. As an example of this embodiment, rip cord 28 is made of a material identified as M30-45—Polyester.

In a specific embodiment, rip cord 28 is made of a material having a base denier of 300 and a final denier of 500, a break strength of 11 N, and an absorption capacity of 45 grams of water absorbed per gram of rip cord 28. As an example of this embodiment, rip cord 28 is made of a material including M40-45—Polyester.

In various embodiments, subunit 20 includes less than 0.1 grams of superabsorbent waterblocking powder (SAP) distributed unattached (e.g., not distributed within rip cord 28) per meter of the subunit 20, or more particularly less than 0.05 grams, or even more particularly less than 0.01 grams.

Figure 4:
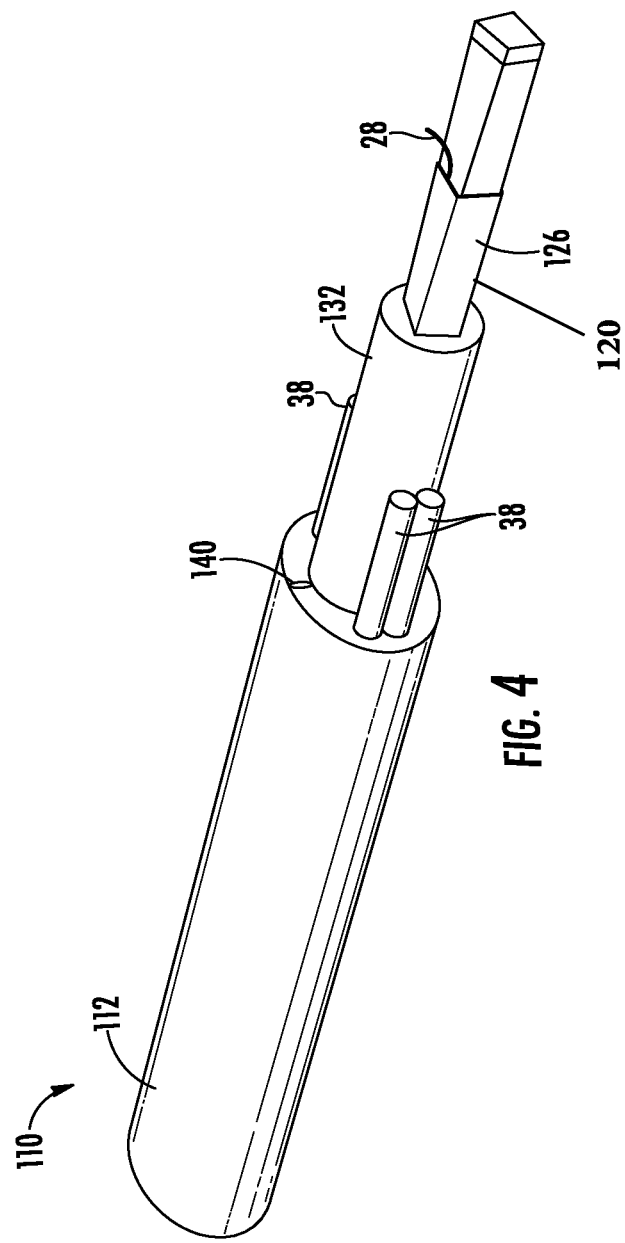
FIG. 4 depicts a perspective view of an optical fiber cable, according to other aspects of the present disclosure.

FIG. 4 depicts a preferential-bend cable 110. Cable 110 is substantially the same as cable 10 except for the differences discussed herein. Preferential-bend cable 110 includes strengthening yarns 38, which extend longitudinally along cable 110. Similar to cable 10, preferential-bend cable 110 includes subunit 120. However, rather than being within a buffer tube, subunit 120 is immediately surrounded by interior jacket 126. Outer jacket 112 surrounds subunit 120 and includes an access feature 140. Access feature 140 provides one or more locations in outer jacket 112 at which outer jacket 112 can be more easily separated as compared to the rest of outer jacket 112.

Figure 5:
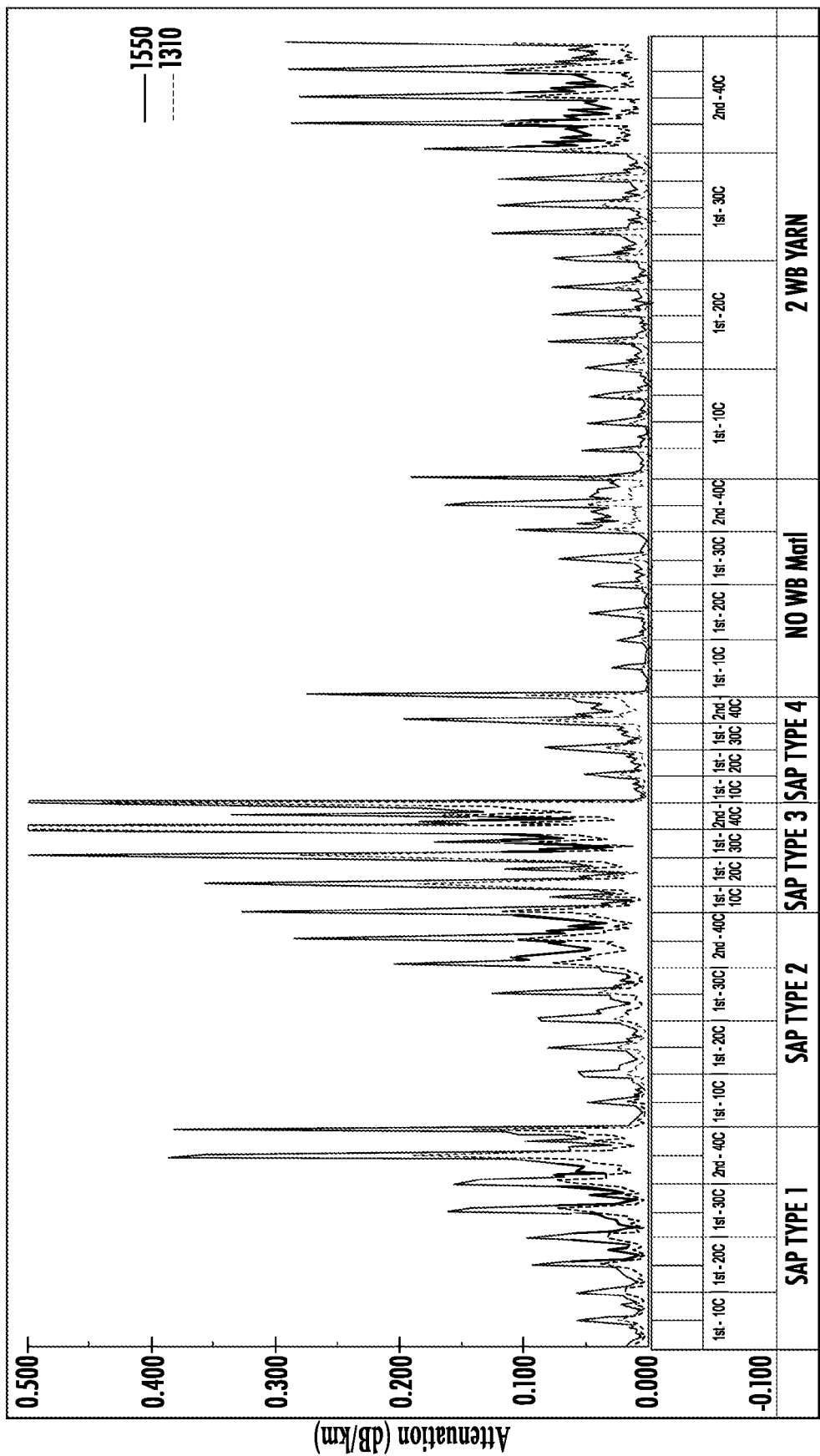
FIG. 5 is a graph showing signal attenuation measurements for various optical fibers at various temperatures.

FIG. 5 depicts signal attenuation of various optical fibers at the identified temperatures when using 200 micron diameter optical fibers. "SAP Type 1" through "SAP Type 4" refer to optical cables with four different types of superabsorbent water blocking powders. "No WB Matl" refers to an optical cable in which no water blocking material is located within the cable jacket. "WB Yarns" refers to one or more embodiments described herein.

Figure 6:
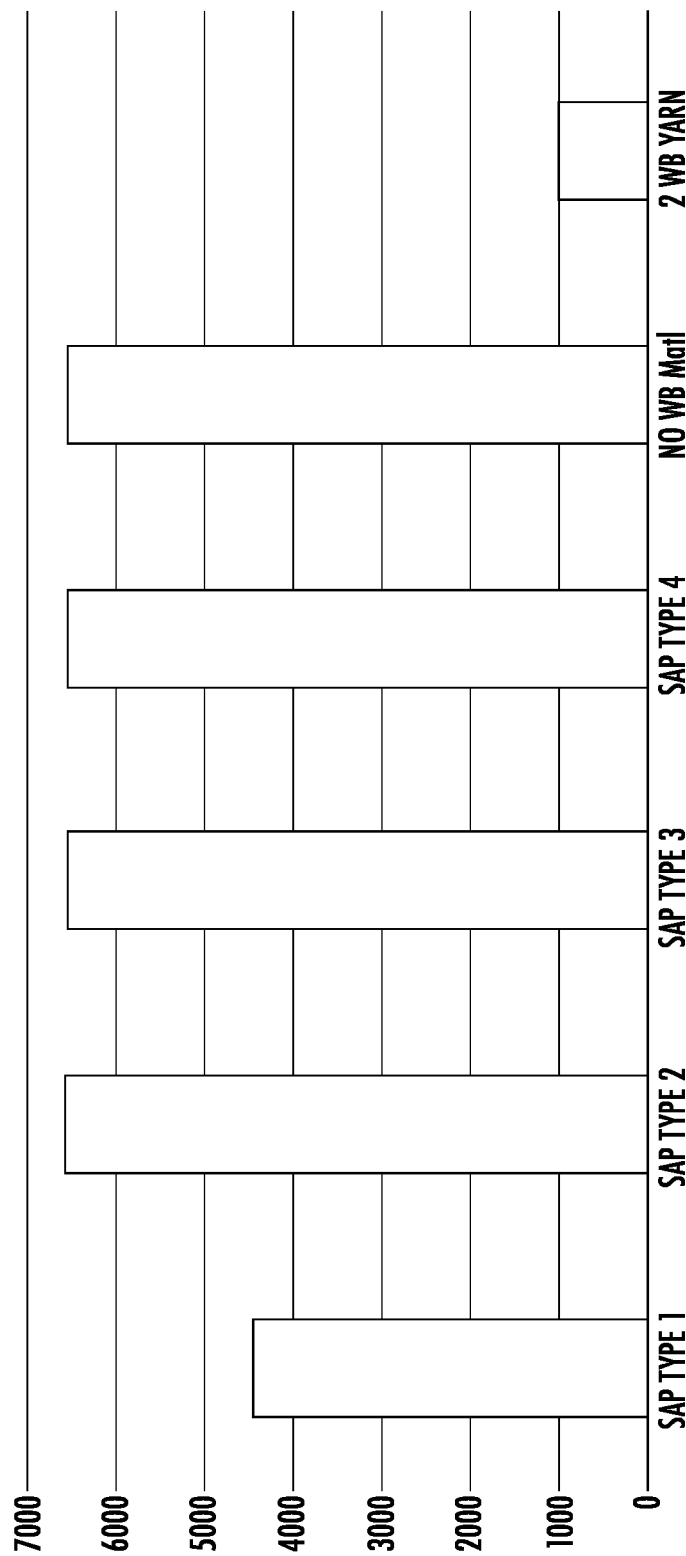
FIG. 6 is a graph showing a comparative analysis of water penetration measurements of optical fiber carrying subunits utilizing various water blocking components.

FIG. 6 depicts water penetration distance inside various optical fiber subunits. This test was performed based on the industry standard test: Insulated Cable Engineers Association (ICEA) 640, Section 7.28 Telecommunications Industry Association FOTP-82 Telcordia Generic Requirements (GR) 20, Section 6.6.7.1. "SAP Type 1" through "SAP Type 4" refer to optical cable with four different types of superabsorbent water blocking powders. "No WB Matl" refers to an optical cable in which no water blocking material is located within the cable jacket. "2 WB Yarns" refers to one or more embodiments described herein, such as a subunit that includes two rip cords 28. As can be seen, 2 water-blocking yarns, such as one or more embodiments of rip cords 28 described herein, within an optical fiber carrying structure inhibited water penetration far more effectively than SAP Types 1 through 4.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. An optical fiber cable, comprising:
a cable jacket having an outer surface defining an outermost surface of the optical fiber cable; and a subunit disposed within the cable jacket, the subunit comprising:
  a stack of optical fiber ribbons, each of the optical fiber ribbons comprising a respective plurality of optical fibers arranged in a planar configuration;
  a subunit jacket that surrounds and is substantially conformal to the stack of optical fiber ribbons; and
  a water-blocking yarn disposed within the subunit jacket, the water-blocking yarn having a break strength less than 75 N;
wherein the water-blocking yarn extends longitudinally along an outer surface of the stack of optical fiber ribbons within the subunit jacket, and wherein the stack of optical fiber ribbons twists around a longitudinal axis of the subunit jacket along a length of the subunit jacket.

2. The optical fiber cable of claim 1, further comprising a second subunit disposed within the outer jacket, the second subunit comprising:
  a second stack of optical fiber ribbons;
  a second subunit jacket that surrounds and is substantially conformal to the second stack of optical fiber ribbons; and
  a second water-blocking yarn disposed within the second subunit jacket.

3. The optical fiber cable of claim 1, wherein a force required to tear the subunit jacket is less than 75 N.

4. The optical fiber cable of claim 1, wherein a force required to tear the subunit jacket is less than 30 N.

5. The optical fiber cable of claim 1, wherein a force required to tear the subunit jacket is less than 11 N.

6. The optical fiber cable of claim 1, wherein a force required to tear the subunit jacket is less than 4 N.

7. The optical fiber cable of claim 1, wherein the water-blocking yarn is impregnated with water-blocking superabsorbent powder.

8. The optical fiber cable of claim 1, wherein the water-blocking yarn is a first water-blocking yarn, wherein the subunit further comprises a second water-blocking yarn, the first water-blocking yarn and the second water-blocking yarn disposed on opposite sides of the stack of optical fiber ribbons.

9. The optical fiber cable of claim 1, wherein a force required to tear the subunit jacket is less than the break strength of the water-blocking yarn.

10. The optical fiber cable of claim 1, wherein the optical fibers of the stack of optical fiber ribbons are 200-micron-diameter optical fibers.

11. The optical fiber cable of claim 1, wherein the water-blocking yarn is characterized by a denier of less than 1000.

12. The optical fiber cable of claim 1, wherein the water-blocking yarn is characterized by a denier of at least 150 and less than or equal to 500.

13. The optical fiber cable of claim 1, wherein the water-blocking yarn is characterized by a water absorption capacity of greater than 10 grams of water per gram of the water-blocking yarn.

14. The optical fiber cable of claim 1, wherein the subunit jacket has less than 0.1 grams of a water-blocking powder disposed therein and unattached to the water-blocking yarn per meter of the subunit.

15. The optical fiber cable of claim 1, wherein the optical fibers of the optical fiber ribbons exhibit a signal attenuation at 1550 nanometers and a temperature of -40° C. of less than 0.3 dB/km.

16. The optical fiber cable of claim 1, wherein the water-blocking yarn is a first water-blocking yarn, wherein the optical fiber cable further comprises a second water-blocking yarn disposed within the subunit jacket, and wherein the first water-blocking yarn and the second water-blocking yarn interface against each other along the length of subunit jacket.

17. An optical fiber cable, comprising:
  a plurality of subunits, wherein each of the subunits comprises:
    a stack of optical fiber ribbons;
    a subunit jacket that is substantially conformal to the stack of optical fiber ribbons; and
    a water-blocking yarn disposed within the subunit jacket and having a break strength of less than 75 N; and
  a cable jacket having an outer surface that defines an outermost surface of the optical fiber cable, the plurality of subunits disposed within the cable jacket;
wherein the water-blocking yarn comprises fibers of PET polyester or liquid crystal polymer;
wherein the water-blocking yarn extends longitudinally along an outer surface of the stack of optical fiber ribbons within each subunit jacket of the plurality of subunits; and
wherein the stack of optical fiber ribbons of each subunit of the plurality of subunits twists around a longitudinal axis of the subunit jacket along a length of the subunit jacket.

18. The optical fiber cable of claim 17, the plurality of subunits being stranded around a longitudinal axis of the optical fiber cable.

19. The optical fiber cable of claim 17, each of the stacks of optical fiber ribbons comprising a plurality of optical fibers, wherein the plurality of optical fibers are 200-micron-diameter optical fibers.

20. A cable, comprising:
  a cable jacket; and
  a subunit that comprises:
    a stack of optical fiber ribbons, wherein each of the optical fiber ribbons comprises a plurality of 200-micron-diameter optical fibers;
    a subunit jacket that surrounds and is substantially conformal to the stack of optical fiber ribbons; and
    a water-blocking rip cord that is disposed within the subunit jacket and that has a break strength of less than 75 N, wherein further the subunit jacket has less than 0.1 grams, per meter of the subunit, of a water-blocking powder distributed therein and unattached to the water-blocking rip cord or any other water-blocking yarn or tape;
  wherein the water-blocking rip cord is characterized by a denier in a range of 150 to 275.

* * * * *